United States Patent [19]
Andres et al.

[11] Patent Number: 5,604,407
[45] Date of Patent: Feb. 18, 1997

[54] METHOD AND DEVICE FOR CONTROLLING VEHICLE INTERIOR LIGHTING

[75] Inventors: Rudolf Andres, Sindelfingen; Armin Staehle, Nufringen; Reinhold Mickeler, Altdorf; Volker Petri, Aidlingen; Helmut Grickscheit, Sindelfingen; Benno Forstner, Weil der Stadt; Dieter Freerichs, Ostelsheim, all of Germany

[73] Assignee: Mercedes-Benz AG, Stuttgart, Germany

[21] Appl. No.: 553,190

[22] Filed: Nov. 7, 1995

Related U.S. Application Data

[63] Continuation of Ser. No. 302,983, Sep. 12, 1994, abandoned.

[30]    Foreign Application Priority Data

Sep. 10, 1993 [DE] Germany .................. 43 30 721.3

[51] Int. Cl.⁶ .................................................. B60Q 1/02
[52] U.S. Cl. ..................... 315/77; 315/324; 315/316
[58] Field of Search .......................... 315/77, 291, 292, 315/307, 316, 324

[56]    References Cited

U.S. PATENT DOCUMENTS

| | | | |
|---|---|---|---|
| 4,866,345 | 9/1989 | Kataoka | 315/77 |
| 5,206,562 | 4/1993 | Matsuno et al. | 315/77 |
| 5,357,169 | 10/1994 | Toyozumi et al. | 315/77 |

FOREIGN PATENT DOCUMENTS

| | | |
|---|---|---|
| 3125610 | 1/1983 | Germany . |
| 3309548C2 | 9/1984 | Germany . |
| 3620861A1 | 12/1987 | Germany . |
| 4131425A1 | 4/1992 | Germany . |
| 4212361 | 3/1993 | Germany . |
| 4235826 | 4/1993 | Germany . |

*Primary Examiner*—Robert Pascal
*Assistant Examiner*—Michael Shingleton
*Attorney, Agent, or Firm*—Evenson, McKeown, Edwards & Lenahan, P.L.L.C.

[57]    ABSTRACT

A method and device for controlling vehicle interior lighting as a function of certain lighting-relevant states, in which the respective turning-on or turning-off process takes place with dimming. The dimming parameters, such as turning-on or turning-off dimming time or desired final brightness, are selected in advance as a function of the vehicle state that activated the control process, which permits a highly variable and situation-specific lighting control. The lighting control unit, depending on signals from a sensor group and according to a program stored in a program memory, controls a lighting device through a controllable switch.

10 Claims, 5 Drawing Sheets

METHOD AND DEVICE FOR CONTROLLING VEHICLE INTERIOR LIGHTING

This application is a continuation of application Ser. No. 08/302,983, filed on Sep. 12, 1994 now abandoned.

BACKGROUND AND SUMMARY OF THE INVENTION

The present invention relates to a device and a method for controlling vehicle interior lighting, in which a plurality of lighting-relevant vehicle states each determined by at least one state condition that can be interrogated, is monitored and if the existence of one of the vehicle states is detected, a corresponding control process to turn the interior lighting on or off is activated.

A vehicle interior lighting is known from German Patent Document 36 20 861 A1 which monitors the position of the vehicle doors as a vehicle state relevant to illumination, and turns on the interior lighting when a door is opened and turns it off on a time-delayed basis when the door is closed, by gradually extinguishing the bulb. The time-delayed shutoff means that the vehicle occupants, even in darkness, can readily perform the actions required to begin driving, for example putting on the safety belt, inserting the ignition key, etc. by means of the interior lighting which is still active. A similar procedure in which the lighting is initially reduced by a certain amount when the door is closed, then remains constant, and finally is dimmed linearly, is disclosed in U.S. Pat. No. 4,866,345.

German Patent Document 33 09 548 C2 describes a vehicle interior lighting control in which a vehicle state is monitored that is governed by two conditions, namely an open or closed vehicle door and the ignition being off or on. When closing of the door is detected, the interior lighting is turned off with a time delay. This also takes place when an open door and an "off" ignition are detected, preventing unnecessary activation of the interior illumination if the vehicle door is accidently left open, while when the door is open and the ignition is on, the interior lighting remains activated.

In an interior lighting system according to German Patent Document 41 31 425 A1, an entry light, a foot area light, and a seat light on the vehicle ceiling are provided which, when opening of the corresponding vehicle door is detected, are switched on in the direction of entry with a brightness that increases from light to light, producing an increase in brightness from the road and the door sill across the floor to the seat.

An object of the present invention is to provide a method and a device for controlling the vehicle interior lighting that has a comfortable vehicle interior lighting control that is optimally adapted to the respective situation, with simultaneously low construction cost.

This and other objects are achieved by the present invention which provides a method for controlling vehicle interior lighting, comprising the steps of: determining each of a plurality of lighting-relevant vehicle states by interrogating at least one state condition that can be interrogated; monitoring the vehicle states and if one of the vehicle states is detected, activating a corresponding control process to turn the interior lighting on or off; wherein the corresponding control processes to turn the interior lighting on or off include respective dimming processes, and includes setting dimming parameters which determine the dimming processes, said dimming parameters being set as a function of the vehicle state that is detected and that activates the corresponding control process.

The objects are also achieved by a device constructed in accordance with the present invention and comprises: a central lighting control unit with a program memory containing a program pattern of the method of the invention; a sensor group coupled to the central lighting control unit, the sensor group interrogating the state conditions for the lighting-relevant vehicle states, and producing output signals that are fed to the central lighting control unit; a lighting device coupled to the central lighting control unit; and a switch coupled between the central lighting control unit and the lighting device, and is controllable by the central lighting control unit for activating and deactivating the lighting device.

The method of the invention takes into account not only one vehicle state, characterized for example by the opening or closing of a vehicle door, but several such lighting-relevant vehicle states established by one or more state conditions that can be interrogated, for example the state of the ignition, central locking, and a glow plug preheater as well as the position of the ignition key. With presettable dimming parameters adjusted to the detected vehicle state, the method then activates a dimming process to turn on or turn off the vehicle interior lighting, with the dimming process being adjustable in a highly variable fashion to the current situation. Provision of a central lighting control unit for the plurality of control functions of the method, whose pattern is stored in a program memory, and by which the controllable switch is controlled, entails only low construction cost.

In certain embodiments of the invention, a lighting-relevant vehicle state includes a chain of several state conditions, which must all be present before lighting control activation takes place. For example, a vehicle state of this kind can consist of the linked conditions of an ignition in the "on" position, an open vehicle door, and the undershooting of a certain boundary value for the measured vehicle interior brightness. Such an improvement makes it possible, when a certain state condition exists, for example an open vehicle door, for different lighting activities to be performed nonetheless as a function of other interrogated state conditions.

Certain embodiments of the invention allow the possibility of turning off the interior lighting depending on the situation, at different rates by a suitable choice of a corresponding shutoff dimming time. In addition, with certain other embodiments, a delay in the start of dimming that depends upon the vehicle state can be achieved for switching off the illumination.

In certain preferred embodiments, for controlled switching-on of the interior lighting as a function of the state of the vehicle, the situation-dependent setting of the turning-on dimming time as well as the resultant final brightness are provided as dimming parameters.

In certain embodiments of the invention, the illumination-relevant vehicle states are ranked so that if a vehicle higher-priority state exists, the corresponding interior lighting control process is activated, for example after interruption of a corresponding control process for a vehicle state of lower priority.

Embodiments of the invention provide that, as a condition inherent to each of the lighting-relevant vehicle states, an interrogation is performed to determine whether the measured vehicle interior brightness is below a preselected limit. This is intended to prevent the vehicle interior lighting being activated unnecessarily in daylight, if another state condition of the respective lighting-relevant vehicle state, for example opening or closing a door, is fulfilled.

Certain embodiments allow the use of vehicle interior brightness as a state condition for the control process that can be interrogated, preferably in the form of a digital, especially a two-valued, bright/dark signal.

The use of only a single connecting lead both for controlling the lighting device and for transmitting the brightness sensor signal in certain embodiments keeps the construction cost low, and also reduces the number of leads that have to be run in the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
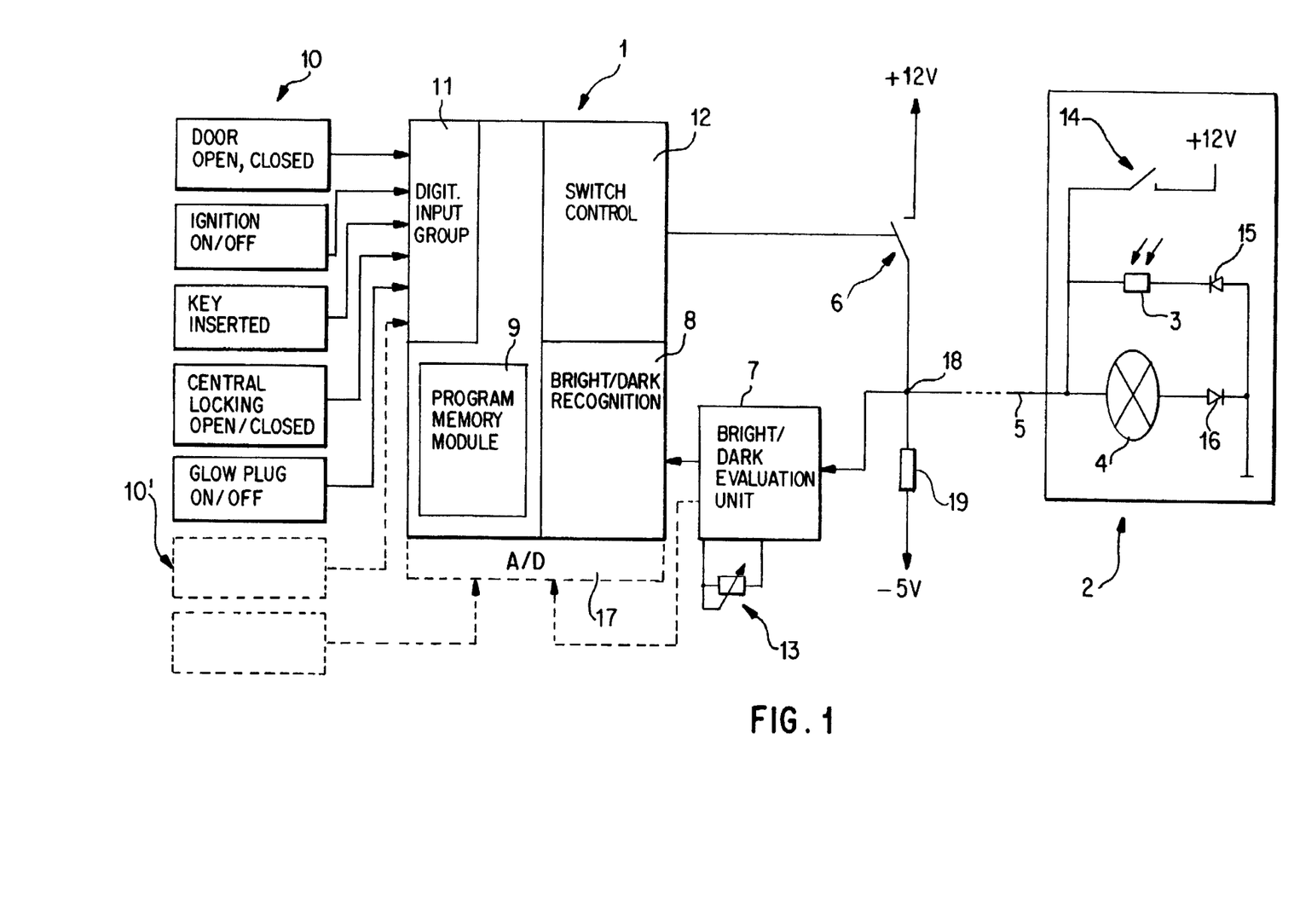
FIG. 1 is a block diagram of a device constructed in accordance with the present invention for controlling the interior lighting of a motor vehicle with a diesel engine.

The device according to the embodiment of FIG. 1 contains a central lighting control unit (1), of which a program memory module (9), a digital input group (11), a bright/dark recognition stage (8) with a digital input, and a switch control part (12) are shown explicitly. In certain embodiments, the control unit (1) also contains an A/D converter (17) indicated by phantom lines.

Digital input group (11) is connected with signals of a group (10) of sensors that are independent of one another. Each sensor of this group (10) checks for the presence of a certain state condition. Thus, sensors are provided for detecting the open or closed state of the vehicle doors, for detecting whether the ignition is on or off, for monitoring whether the ignition key has been inserted or withdrawn, for monitoring whether a central locking system is locked or open, and for detecting whether glow-plug warmup is taking place in a diesel-powered vehicle. An additional sensor unit (10') is indicated by dashed lines to symbolize that additional sensors may be required.

From the area of lighting control unit (1) a connecting lead (5) runs to a lighting unit (2) for the vehicle interior, which has a bulb (4) as a lighting device. Bulb (4) is grounded through a diode (16) at one terminal. The other terminal of lamp (4) is connected to one end of lead (5) and to an onboard system connector (+12 V) through a manually operable switch (14). When switch (14) is closed manually, bulb (4) is switched on in any case, independently of control-induced activation.

A brightness sensor (3) in the form of a photosensitive resistor is provided in lighting unit (2). Brightness sensor (3) is wired in series with another diode (15) parallel to bulb (4) and its diode (16), with the two diodes (15, 16) being polarized in such fashion that diode (15) associated with brightness sensor (3) does not conduct when manual switch (14) is closed, while diode (16) associated with bulb (4) conducts.

The other end of lead (5) runs to a connecting node (18) connected through a resistor (19) with a negative auxiliary voltage source (−5 V) and through a switch (6) controllable by lighting control unit (1) with the onboard electrical system (+12 V). When controllable switch (6) is opened, resistor (19) and photosensitive resistor (3) form a voltage divider between ground and the negative auxiliary voltage (−5 V), with diode (15) polarized in the conducting direction and associated with brightness sensor (3). Hence, an analog voltage can be tapped off at connecting node (18) in this case, the level of said voltage being a measure of the vehicle interior brightness measured by photosensitive resistor (3). This analog voltage signal is fed to a bright/dark signal evaluation unit (7), which converts it into a digital two-valued bright/dark signal with a specified brightness limit, for which purpose an inverting amplifier and connected comparator are provided for example. The brightness limit can be adjusted by a potentiometer (13) on bright/dark signal evaluation unit (7). The digital brightness signal from bright/dark signal evaluation unit (7) is then fed to the input of the bright/dark recognition stage (8) of lighting control unit (1).

If lighting control unit (1) is equipped with the A/D converter (17), the bright/dark signal evaluation unit (7) can be an inverting amplifier, that instead of digital evaluation, or optionally switchably, delivers the analog voltage signal with analog amplification to A/D converter (17) of control unit (1). The brightness limit is then set in central control unit (1), stored for example in program memory (9). In this case, the lighting control unit (1) can use the analog brightness signal supplied to it for additional functions as well, without it already being digitized. As the dashed area shows, in certain embodiments one or more sensors in sensor group (10) are provided, which deliver an analog sensor signal, and connect the signal to A/D converter (17).

Central lighting control unit (1) evaluates the condition-seeking signals from sensor group (10) arriving at digital input group (11) as well as the brightness signal applied to bright/dark recognition stage (8) or A/D converter (17), according to a program stored in program memory (9), and then controls, in a manner likewise determined by this program, controllable switch (6) through switch control element (12). Closing controllable switch (6) connects one terminal of bulb (4) through connecting lead (5) to the onboard electrical system (+12 V), so that bulb (4) is switched on. By pulsed switching on and off of controllable switch (6), this switch comprising for example a MOS field effect transistor, the brightness and the brightness pattern over time can be set as desired to provide a specific dimming function using the ratio of the "on" time to the total time of a pulse as well as a suitable time change in this ratio by pulse width modulation. To avoid flickering, the switching frequency should be greater than approximately 60 Hz.

Figure 2A:
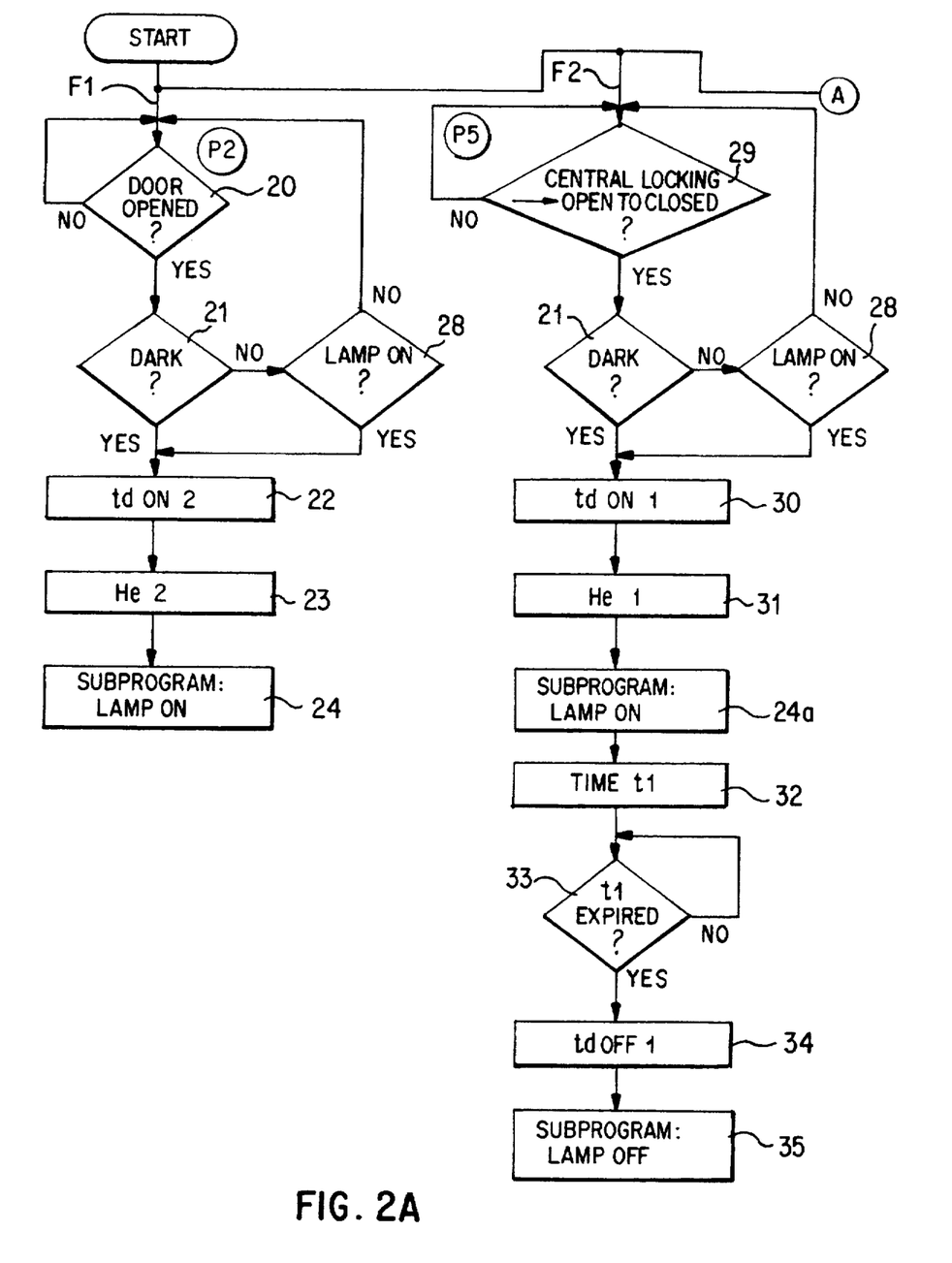
FIGS. 2A to 2C show corresponding portions of the program flow chart, according to which the control device of FIG. 1 operates.
Figure 2B:
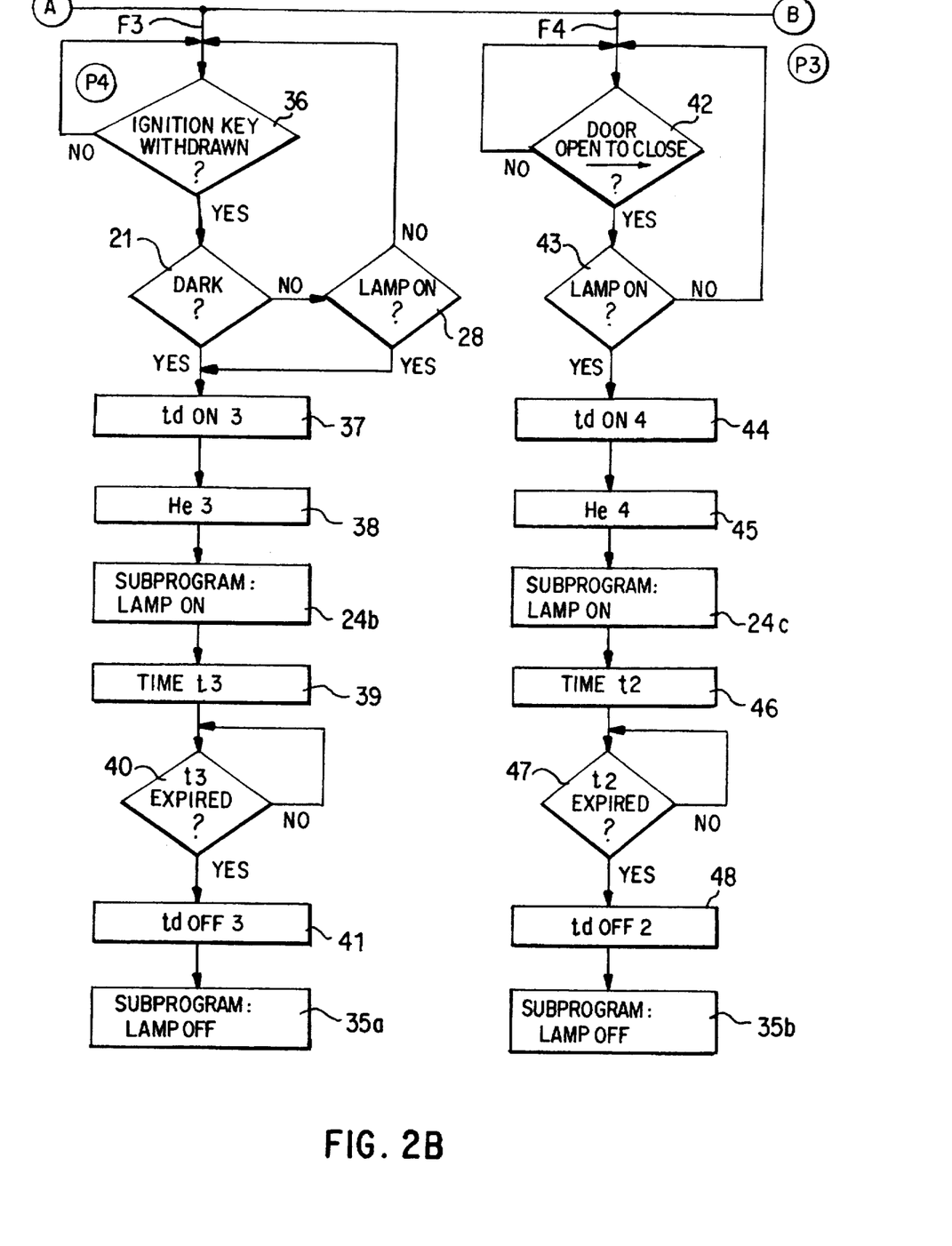
Figure 2C:
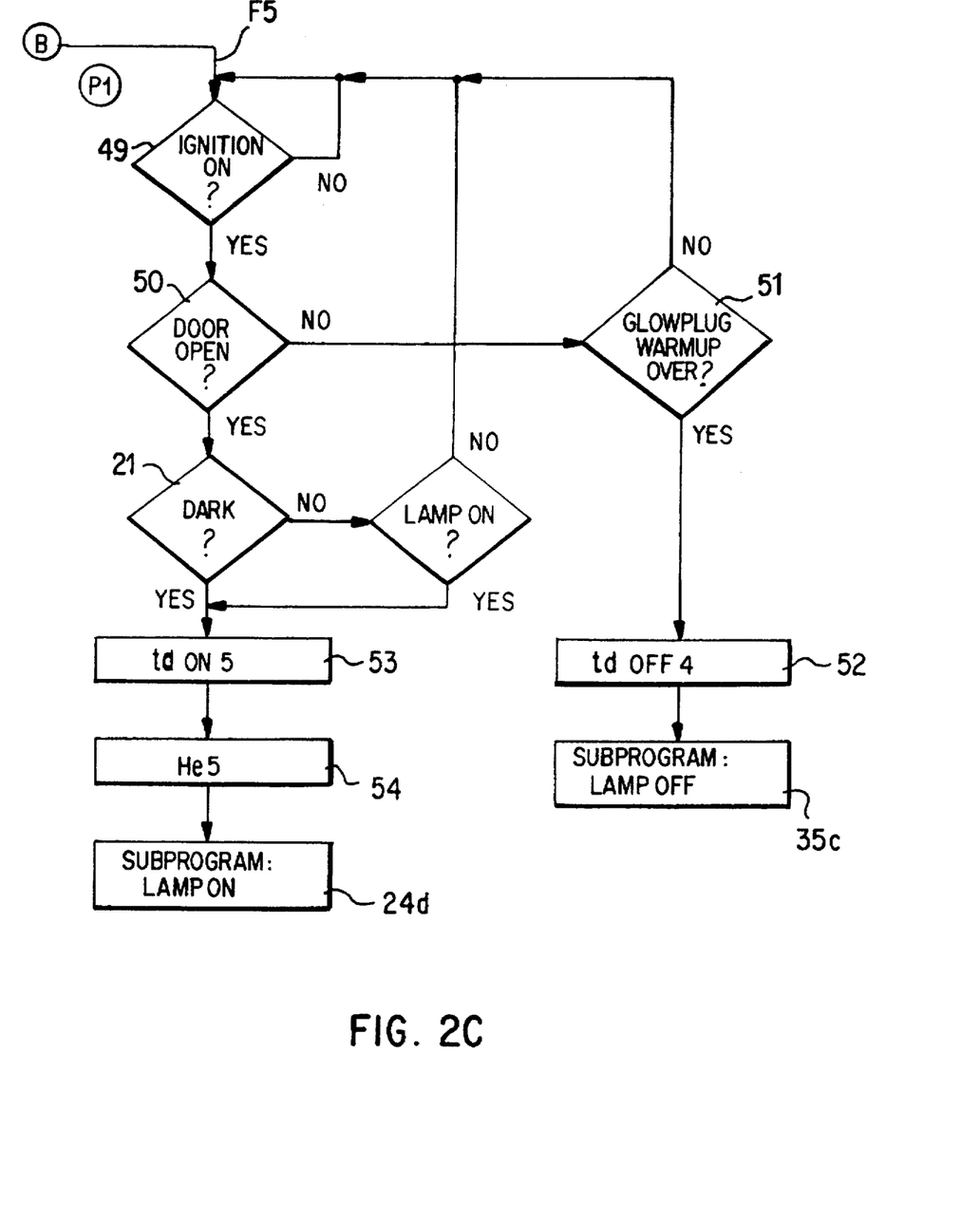

The process stored in program memory (9) of central lighting control unit (1), according to which dimmed lamp control always takes place as a function of the various state conditions that exist and are interrogated, will now be described in detail with reference to FIGS. 2A to 2C as well as FIG. 3. FIGS. 2A to 2C show respective parts of the entire program flow that are joined together at points (A) and (B) indicated.

Beginning with the start of the program shown at the top in FIG. 2A, the process branches depending on five mutually independent vehicle states (F1 to F5), established by a plurality of state conditions that can be interrogated.

The first vehicle state (F1) is characterized by an open vehicle door and low interior brightness, i.e. undershooting of the established brightness limit. This part of the program, shown on the left in FIG. 2A, serves to ensure that the interior lighting remains dimmed during darkness when a vehicle door is already open or has just been opened.

In an interrogation step (20), a check is initially made to determine whether a door has been opened. If this is the case, in an additional interrogation step (21) an interrogation is conducted to determine whether a brightness measurement performed with controllable switch (6) open produces undershooting of the preset brightness limit. If it is, in further successive steps (22, 23) a corresponding switching-on dimming time (tdon2) as well as a corresponding desired final brightness (He2) are determined whose values are stored specifically for this vehicle state in the stored program. Then a lamp turn-on subprogram step (24) takes place, which is shown in more detail in the upper half of FIG. 3. After the subprogram is started in step (25), in the next step (26) the existing actual brightness (Hi) is detected and transmitted to central lighting control unit (1), preferably, instead of providing an additional brightness sensor, by the above-described optional analog signal evaluation of the signal from the already existing brightness sensor (3), for example by providing a switching capability controllable by the lighting control unit (1) between digital and analog signal evaluation in bright/dark signal evaluation unit (7). Control unit (1), by the above-mentioned selection of the blanking conditions of controllable switch (6), as well as its change over time, controls the subsequent dimming process in step (27) for dimmed activation of bulb (4) to change the actual brightness (Hi) to the desired final brightness (He2) desired for this vehicle state (F1) (i.e. x=2 in step (27)) according to a preprogrammed characteristic curve. For example, the characteristic curve consists of an increase in brightness that is linear as a function of time, but it is understood that lamp activation alternatively can take place according to another desired characteristic curve.

If a vehicle interior brightness that is above the brightness limit is detected in interrogation step (21), an additional interrogation step (28) follows to determine whether bulb (4) is already switched on, e.g. by interrogating the state of controllable switch (6), and therefore whether this limit has been exceeded. If bulb (4) is not switched on, it follows that the brightness limit has been exceeded by the ambient brightness. In this case, unnecessary illumination activation is suppressed and the program returns to the first interrogation step (20). If bulb (4) is switched on, however, for example by a previous switching-on dimming process, the already described dimming process will likewise be performed so that bulb (4) lights and the final brightness value (He2) desired, results. The additional inquiry as to whether bulb (4) is switched on, if exceeding of a preset brightness limit was recognized earlier, is desirable in particular because brightness sensor (3) is integrated into lighting unit (2) and consequently is significantly influenced by the brightness of the bulb, making it possible to dim the bulb (4) to lower light intensity if it is shining too brightly for the given vehicle state.

The second lighting-relevant vehicle state test (F2) consists of the two state conditions to be interrogated whether central locking has been opened and only a small amount of brightness is available. The part of the program shown in the right-hand half of FIG. 2A serves to turn on interior lighting in darkness, variably dimmed for a certain space of time, when central locking is open, and to turn off the interior lighting after dimming following expiration of a preset time delay.

In detail, in the corresponding part of the program shown in the right-hand half of FIG. 2A, a check is performed in a first interrogation step (29) to determine whether central locking has been changed from its locked to its open state. If this is the case, interrogation step (21) is performed once more to determine whether the interior brightness is below the preselected brightness limit. If the answer is yes, the following steps (30, 31) are then performed to determine a turn-on dimming time (tdon1) as well as desired final brightness (He1). As described with reference to the program part for the first vehicle state (F1), this continuation of the program is selected if brightness above the limit is detected, but interior lighting that had been switched on was detected simultaneously in the following interrogation step (28). It should be noted that the values thus established for the switching-on dimming time (tdon1) and the final brightness (He1) are preset, adjusted to the second vehicle state (F2), and accordingly can differ, especially from the other vehicle states, for example the switching-on time (tdon2) described above and the final brightness (He2) of the first vehicle state (F1). Then a lamp turn-on subprogram (24a) is performed which corresponds in its steps to that for the first vehicle state (F1), with only the possibly changed input parameters of the duration of the switching-on dimming process (tdon1) and the final brightness (He1) and, if necessary, possibly also the switching-on characteristic, i.e. the time curve of the change in brightness. At the same time, in a step (32), a delay time (t1) is fixed whose expiration is detected in a subsequent interrogation step (33). Then, in a step (34), a turn-off dimming time (tdoff1) is established and with this dimming parameter, a subprogram is performed for switching off lamp (4) with dimming in step (35).

Figure 3A:
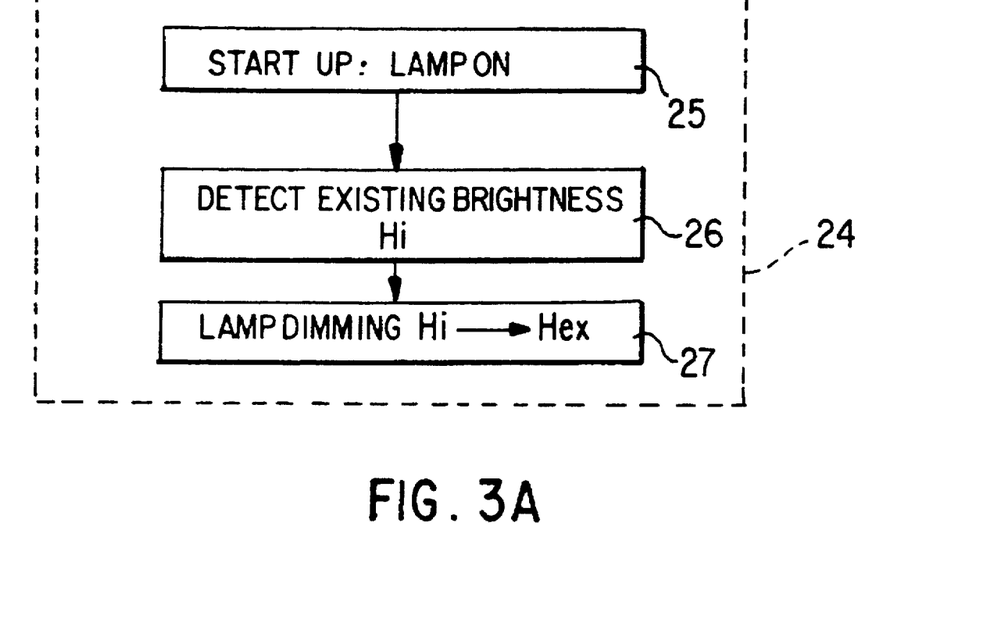
FIG. 3 show two flowcharts for two subprograms used in FIGS. 2A to 2C.
Figure 3B:
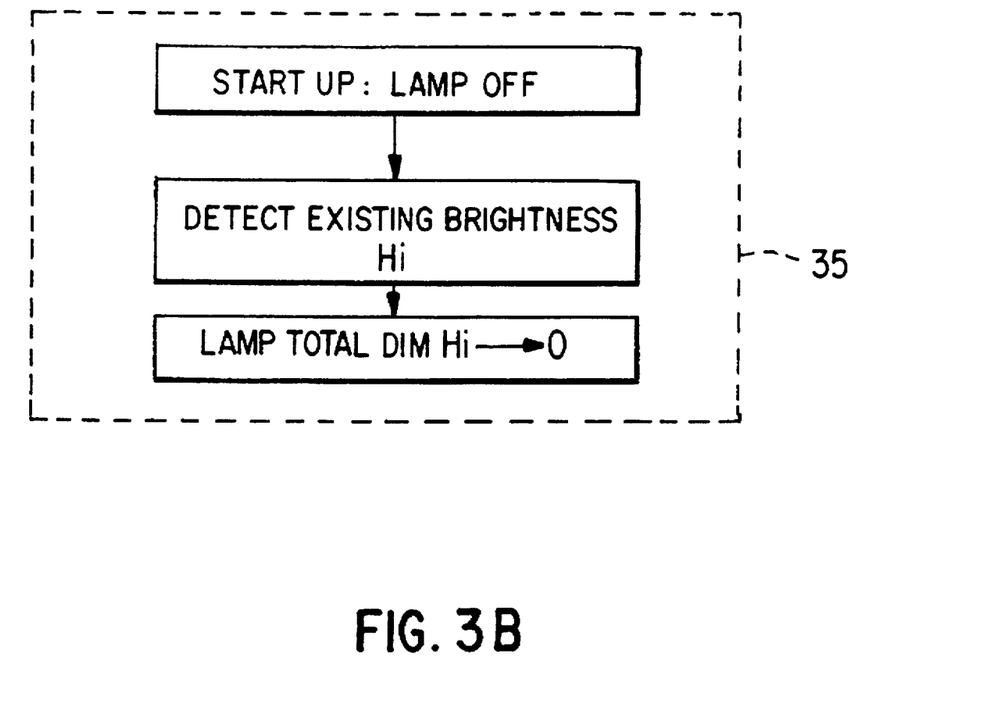

This subprogram step (35) is shown in more detail in the lower half of FIG. 3. Following the start of this subprogram, the actual brightness (Hi) in the vehicle interior is determined once more. Central lighting control unit (1) switches lamp (4) by appropriate control of switch (6) with an adjustable desired time pattern with dimming down to zero from the actual brightness (Hi), which in this case corresponds to the final brightness (He1) set before and therefore needs nothing extra to be measured to determine it. Once again the time pattern of this shutoff dimming process is variably adjustable, for example according to a linear, exponential, or logarithmic curve.

The third illumination-relevant vehicle state (F3) incorporates the conditions that can be interrogated, whether the ignition key has been withdrawn and the brightness is below the preselected brightness limit. This part of the program shown at the left in FIG. 2B serves to turn on the internal illumination for a certain period of time, with variable dimming, as soon as the ignition key is withdrawn in darkness. This allows the occupant to perform the actions necessary before getting out, e.g. releasing the seat belt, with adequate brightness. After a preset time delay has expired, the internal lighting is turned off, with variable dimming.

Specifically for this purpose, an interrogation is performed initially in step (36) to determine whether the ignition key has been withdrawn. If the answer is yes, then the brightness interrogation step (21) already described above is performed, followed by, as described above, in the event of a negative answer, interrogation step (28) through a switched-on bulb (4). With a corresponding positive answer, steps (37, 38) to determine the desired switching-on time (tdon3) desired for this vehicle state (F3) and the final brightness (He3) are performed. With these dimming parameters, a lamp switching-on subprogram (24b) is performed analogously to the corresponding subprogram (24, 24a) described above. At the same time, in step (39) a delay (t3) is set whose expiration is checked with recursive interrogation step (40). If delay time (t3) has expired, in the next step (41) a shutoff dimming time (tdofff3) is set and a bulb shutoff subprogram (35a) is performed, which in turn takes place analogously to the subprogram (35) described in connection with the program part that belongs to the second vehicle state (F2), whereby of course the shutoff dimming times and duration of the shutoff dimming process can again be chosen differently.

The fourth lighting-relevant vehicle state (F4) contains as conditions that can be interrogated, whether the vehicle doors are closed and the interior lighting has been turned on in advance. The part of the program shown in the right half of FIG. 2b serves in this case to allow the interior lighting to be turned on for a certain period of time at a certain brightness level and, after an adjustable time delay has expired, to turn off the light with variable dimming. For this purpose, in a first interrogation step (42), the closing of the doors and (if the answer is yes) in a subsequent interrogation step (43) the fact of bulb (40) being on is checked. If bulb (4) was not turned on, no lighting control process is activated. On the other hand, if bulb (40) was turned on, in successive steps (44, 45) the turn-on dimming time (tdon4) and final brightness (He4) associated with this vehicle state (F4) are set. With these dimming parameters, the lamp turn on subprogram step (24c), as described in greater detail in reference to step (24), is performed. At the same time a shutoff delay time (t2) is set in step (46), whose expiration is checked by time expiration interrogation step (47) which may be performed repeatedly. After delay time (t2) has expired, in step (48) a shutoff dimming time (tdoff2) is set and with this dimming parameter a lamp shutoff subprogram step (35b) is then performed, so that bulb (4) is turned off with dimming. The shutoff subprogram (35b) again proceeds analogously to shutoff subprogram (35) described above, whereby only the dimming parameters, i.e. the shutoff dimming time and the shutoff dimming characteristic, need to be modified.

The fifth vehicle state (F5) involves the conditions that can be interrogated, as to whether the ignition has been turned on and a vehicle door is open. If the answer is yes, a turn-on dimming process is activated in darkness. On the other hand, if the door is shut, after the end of a diesel glow-plug warmup an interrogation is conducted and if the answer is positive, a shutoff dimming process is triggered. This corresponding part of the program is shown in FIG. 2C. It serves firstly to illuminate the interior of the vehicle if the ignition is turned on and the driver's door is open in darkness. On the other hand, after the ignition is switched on and the vehicle doors are shut, the possibly activated interior lighting is turned off with dimming, but only after the glow-plug warmup is over. As a result the driver can get in, shut the doors, turn on the ignition, and then initiate the glow-plug warmup and still be able to perform the necessary additional steps before starting to drive before the interior lighting is turned off with dimming, with the lighting still activated, for example to find the seat belt buckle and put on the safety belt. The interior lighting then goes out only after the glow-plug warmup is over.

Specifically, in this part of the program, a check is initially conducted in the first interrogation step (49) to determine whether the ignition has been turned on. If this is the case, in the next interrogation step (50) the door state is checked. If the doors are shut, the program continues with interrogation step (51) after the glow-plug warmup is over. If this is not yet the case, the program returns in a loop before interrogation step (49) for the state of the ignition. However, as soon as the termination of the glow-plug warmup has been recognized in step (51), in step (52) a corresponding shutoff dimming time (tdoff4) is set and with this dimming parameter as well as a preset shutoff dimming characteristic, a bulb shutoff subprogram step (35c) is again performed analogous to the one described above.

On the other hand, if in interrogation step (50) for the door state an open door is found, the brightness interrogation step (42) is initiated. If the interior brightness is below the preselected brightness limit, a turn-on dimming process begins, which comprises of setting a turn-on dimming time (tdon5) in step (53) as well as a corresponding desired final brightness (He5) in step (54), as well as the lamp turn-on subprogram (24d) performed with these dimming parameters, which is performed in a manner analogous to the lamp turn-on subprogram (24) described above.

The five parts of the program that are parallel to the starting point of the process, each assigned to one of the lighting-relevant vehicle states (F1 to F5), is assigned a ranking for its performance, as indicated in FIGS. 2A to 2C by showing priorities (P1) to (P5). Here, (P1) represents the highest priority and (P5) the lowest, between which the other priorities (P2, P3, P4) are arranged in stages. As soon as the conditions of an illumination-relevant vehicle state of higher priority exist, the corresponding part of the program is performed, while a program that may possibly already be running is interrupted and replaced by another lighting-relevant vehicle state with a lower priority.

It follows from the above description of the control method for the interior lighting that a control process for the interior lighting that is adjusted to a very specific vehicle state can be performed. In particular, activation of interior lighting takes place with dimming assuming a turn-on or turn-off dimming time adjusted to the respective vehicle state, as well as a desired final brightness in the event of a turning-on process. In addition, the characteristic which the time pattern of the dimming process follows can be set in suitable fashion specifically for the respective vehicle state. Thus for example it is possible to turn on the interior lighting with maximum bulb brightness when the door is opened in the dark with the ignition turned off, but to turn on the interior lighting with a lower brightness when the door is opened with the ignition turned on, in order not to blind the driver. The latter will happen when the part of the program for the fifth vehicle state with the highest priority (P1) is performed, with the corresponding final brightness (He5) being chosen to be less than the maximum bulb brightness. On the other hand, if the ignition is turned off when the door is opened, the part of the program for the first vehicle state (F1) which has the second highest priority (P2) is performed, whereupon the desired final brightness (Hc2) is set the maximum bulb brightness.

If, as an additional example of the variability of the interior lighting control method, the door is closed with the ignition turned off, the part of the program for the fourth vehicle state (F4) with the third highest priority (P3) is performed, which at the end leads to a shutoff dimming process. By selecting a relatively long shutoff dimming time (tdoff2), this dimming can be performed at a low speed with the ignition turned off. On the other hand, if the door is shut with the ignition turned on, in order not to blind the driver, this slow dimming must be interrupted and the interior lighting turned off very rapidly with dimming after the glow-plug warmup. This is accomplished by virtue of the fact that when the ignition is switched on, the part of the program for the fifth vehicle state (F5), because of its higher priority (P1), interrupts the part of the program associated with the fourth vehicle state (F4) and, through interrogation steps (49, 50, and 51), initiates a rapid shutoff dimming process, for which purpose the corresponding dimming time (tdoff4) is set to a very low value.

For the individual skilled in the art, a plurality of additional variations on the method described above and the device described above for controlling the interior lighting of a vehicle is possible within the scope of the invention. For example, one or more of the five lighting-relevant vehicle states for interior lighting control can be omitted. If a corresponding adverse affect on comfort is taken into account, bright/dark detection can be omitted as well, so that the brightness sensor and the processing of its sensor signal are omitted and lamp control becomes independent of the existing interior brightness.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for controlling vehicle interior lighting, comprising the steps of:

determining each of a plurality of lighting-relevant vehicle states by interrogating at least one state condition that can be interrogated;

monitoring the vehicle states and if one of the vehicle states is detected, activating a corresponding control process to turn the interior lighting on or off;

wherein the corresponding control processes to turn the interior lighting on or off each include a respective dimming process, wherein a lighting brightness during a certain time interval is variably set to a range between a maximum brightness and a zero brightness for each vehicle state, said respective dimming process for each vehicle state being determined by corresponding dimming parameters for each vehicle state, and includes variably setting values of said dimming parameters as a function of the vehicle state that is detected and that activates the corresponding control process.

2. Method according to claim 1, wherein at least one of the vehicle states is determined by a chain of several state conditions that are interrogatable and exists only when all of the chain of several state conditions are met.

3. Method according to claim 2, wherein the control process for turning off the interior lighting includes setting in advance a shutoff dimming time as a function of the state of the vehicle as a dimming parameter.

4. Method according to claim 1, wherein the control process sets a delay time as a function of the vehicle state to switch off the interior lighting as a dimming parameter, said delay time delaying beginning of the dimming process.

5. Method according to claim 1, further comprising setting a turn-on dimming time and final brightness for the control process to turn on the interior lighting as a dimming parameter.

6. Method according to claim 1, wherein the lighting-relevant vehicle states are assigned a priority sequence relative to the activation of an interior lighting control process, such that if a higher priority lighting-relevant vehicle state exists, the corresponding interior lighting control process is activated and any previously activated control process is interrupted.

7. Method according to claim 2, wherein a state condition for each of the lighting-relevant states consists in the measured vehicle interior brightness being below a preset limit.

8. Device for controlling vehicle interior lighting, comprising:

a central lighting control unit with a program memory, said control unit including:

means for determining each of a plurality of lighting-relevant vehicle states by interrogating at least one state condition that can be interrogated;

means for monitoring the vehicle states;

means for activating a corresponding control process if one of the vehicle states is detected to turn the interior lighting on or off, wherein the corresponding control processes to turn the interior lighting on or off each include respective dimming process, said activating means including means for variably setting a lighting brightness for each respective dimming process during a certain time interval to a range between a maximum brightness and a zero brightness, said dimming process for each vehicle state being determined by corresponding dimming parameters, and including means for variably setting values of said dimming parameters as a function of the vehicle state that is detected and that activates the corresponding control process;

wherein said means for detecting includes a sensor group coupled to the central lighting control unit, the sensor group interrogating the state conditions for the lighting-relevant vehicle states, and producing output signals that are fed to the central lighting control unit;

a lighting device coupled to the central lighting control unit; and a switch coupled between the central lighting control unit and the lighting device, and is controllable by the central lighting control unit for activating and deactivating the lighting device.

9. Device according to claim 8, further comprising a brightness sensor forming a part of the lighting device and being coupled to the control unit, said brightness sensor detecting vehicle interior brightness, the central lighting control unit providing an output signal that serves as information for controlling the switch.

10. Device according to claim 9, further comprising a bright/dark signal evaluation unit coupled to the brightness sensor and to the central lighting control unit, the bright/dark signal evaluation unit receiving the signal from the brightness sensor, and includes means for adjusting a brightness limit and means for generating a digital brightness signal that is supplied to the central lighting control unit.

\* \* \* \* \*